US012773806B2

(12) United States Patent
Chang

(10) Patent No.: US 12,773,806 B2
(45) Date of Patent: Oct. 27, 2026

(54) POCKET HOLE DRILLING DEVICE

(71) Applicant: Pei-Wen Lin, Taichung City (TW)

(72) Inventor: Pin-Feng Chang, Taichung City (TW)

(73) Assignee: Pei-Wen Lin, Taichung City (TW)

( * ) Notice: Subject to any disclaimer, the term of this patent is extended or adjusted under 35 U.S.C. 154(b) by 240 days.

(21) Appl. No.: 18/898,365

(22) Filed: Sep. 26, 2024

(65) Prior Publication Data

US 2025/0367737 A1 Dec. 4, 2025

(30) Foreign Application Priority Data

May 29, 2024 (TW) ................................ 113205544

(51) Int. Cl.
*B27C 3/04* (2006.01)

(52) U.S. Cl.
CPC .......... *B27C 3/04* (2013.01); *B23B 2260/004* (2013.01); *B23B 2260/026* (2013.01); *Y10T 408/352* (2015.01)

(58) Field of Classification Search
CPC ............. Y10T 29/5107; Y10T 408/348; Y10T 408/35; Y10T 408/352; Y10T 409/30756; B27C 3/00; B27C 3/04; B27C 3/06; B27C 5/02; B23B 39/10; B23B 2260/026; B23B 2260/004
USPC ......... 29/26 A; 144/134.1, 144.52, 365, 367; 408/24, 25, 26; 409/199
See application file for complete search history.

(56) References Cited

U.S. PATENT DOCUMENTS 4,084,629 A * 4/1978 Kreusler ................... B27C 5/00 24/484
4,537,234 A * 8/1985 Onsrud ..................... B27C 5/02 408/136
4,603,719 A * 8/1986 Durney .................... B27M 1/08 409/199
5,553,645 A * 9/1996 Durney ..................... B27C 9/04 409/199
5,667,000 A * 9/1997 Bean ......................... B27C 5/10 144/136.7
5,772,368 A * 6/1998 Posh .................... B23Q 9/0085 144/136.95
6,016,854 A * 1/2000 Ziegler ................ B23Q 1/5468 144/135.2
(Continued)

FOREIGN PATENT DOCUMENTS

CA 2258245 A1 * 7/2000 ............... B27C 5/02
DE 3736757 C1 * 5/1989 ............... B27C 5/02

*Primary Examiner* — Sunil K Singh
*Assistant Examiner* — Michael Vitale
(74) *Attorney, Agent, or Firm* — HSML P.C.

(57) ABSTRACT

A pocket hole drilling device includes a rack, a drilling unit, a routing unit, a first sleeve unit, a second sleeve unit, and a rotary frame that is connected to the rack. The first sleeve unit holds the drilling unit, and includes a first fixing seat that is connected to the rotary frame, a first mounting seat that is connected to the first fixing seat, a first bushing member that has at least one first gap, and two first bolts that fasten the first mounting seat to the first fixing seat. The second sleeve unit holds the routing unit, and includes a second fixing seat that is connected to the rotary frame, a second mounting seat that is connected to the second fixing seat, a second bushing member that has at least one second gap, and two second bolts that fasten the second mounting seat to the second fixing seat.

7 Claims, 9 Drawing Sheets

(56) References Cited

U.S. PATENT DOCUMENTS

| | | | | |
|---|---|---|---|---|
| 7,374,373 | B1 * | 5/2008 | Park | B23B 47/28 408/46 |
| 7,641,424 | B1 * | 1/2010 | Sommerfeld | B27C 3/02 408/99 |
| 10,220,540 | B1 * | 3/2019 | Durney | B27C 5/06 |
| 11,045,970 | B1 * | 6/2021 | Durney | B23B 51/0054 |
| 11,938,578 | B2 * | 3/2024 | Plöckl | B23C 1/12 |
| 2023/0311360 | A1 * | 10/2023 | Durney | B27C 3/04 408/30 |

* cited by examiner

POCKET HOLE DRILLING DEVICE

CROSS-REFERENCE TO RELATED APPLICATION

This application claims priority to Taiwanese Utility Model Patent Application No. 113205544, filed on May 29, 2024, the entire disclosure of which is incorporated by reference herein.

FIELD

The present disclosure relates to a pocket hole drilling device, and more particularly to a pocket hole drilling device to which different sizes of motors may be mounted.

BACKGROUND

Generally speaking, in order to fixedly interconnect two engagement members by a fastener (e.g., a wood screw), one of the engagement members has to be machined to have a groove and a bore that communicates with the groove, and then the fastener extends through the bore and is positioned in the groove to fixedly interconnect the engagement members.

An existing pocket-cutting device disclosed in U.S. Patent Publication No. US20230311360A1 includes a machine bed, a router assembly that is mounted to the machine bed, and a drilling assembly that is mounted to the machine bed. The router assembly routs an object such that the object is formed with a groove. The drilling assembly drills the object such that the object is formed with a bore.

Because a size of an outer diameter of a motor that is used in each of the router assembly and the drilling assembly differs between brands or types, how to make the router assembly and the drilling assembly be stably mounted to the machine bed becomes a problem that needs to be solved.

SUMMARY

Therefore, an object of the disclosure is to provide a pocket hole drilling device that can alleviate the drawback of the prior art.

According to the disclosure, the pocket hole drilling device includes a rack, a rotary frame, a drilling unit, a routing unit, a first sleeve unit, and a second sleeve unit. The rotary frame is rotatably connected to the rack and is rotatable between a first position and a second position. The drilling unit is mounted to the rotary frame. The routing unit is mounted to the rotary frame. The first sleeve unit surrounds and holds the drilling unit, and is connected to the rotary frame. The first sleeve unit includes a first fixing seat that is connected to the rotary frame, a first mounting seat that is removably connected to the first fixing seat, a first bushing member that is clamped between the first fixing seat and the first mounting seat, and two first bolts that fasten the first mounting seat to the first fixing seat. The first bushing member has at least one first gap. The first bushing member is constrained by the drilling unit, the first fixing seat, and the first mounting seat, and a diameter thereof is adjustable. The second sleeve unit surrounds and holds the routing unit, and is connected to the rotary frame. The second sleeve unit includes a second fixing seat that is connected to the rotary frame, a second mounting seat that is removably connected to the second fixing seat, a second bushing member that is clamped between the second fixing seat and the second mounting seat, and two second bolts that fasten the second mounting seat to the second fixing seat. The second bushing member has at least one second gap. The second bushing member is constrained by the routing unit, the second fixing seat, and the second mounting seat, and a diameter thereof being adjustable.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 6 is a fragmentary sectional view taken along line VI-VI in

FIG. 4.

DETAILED DESCRIPTION

Figure 1:
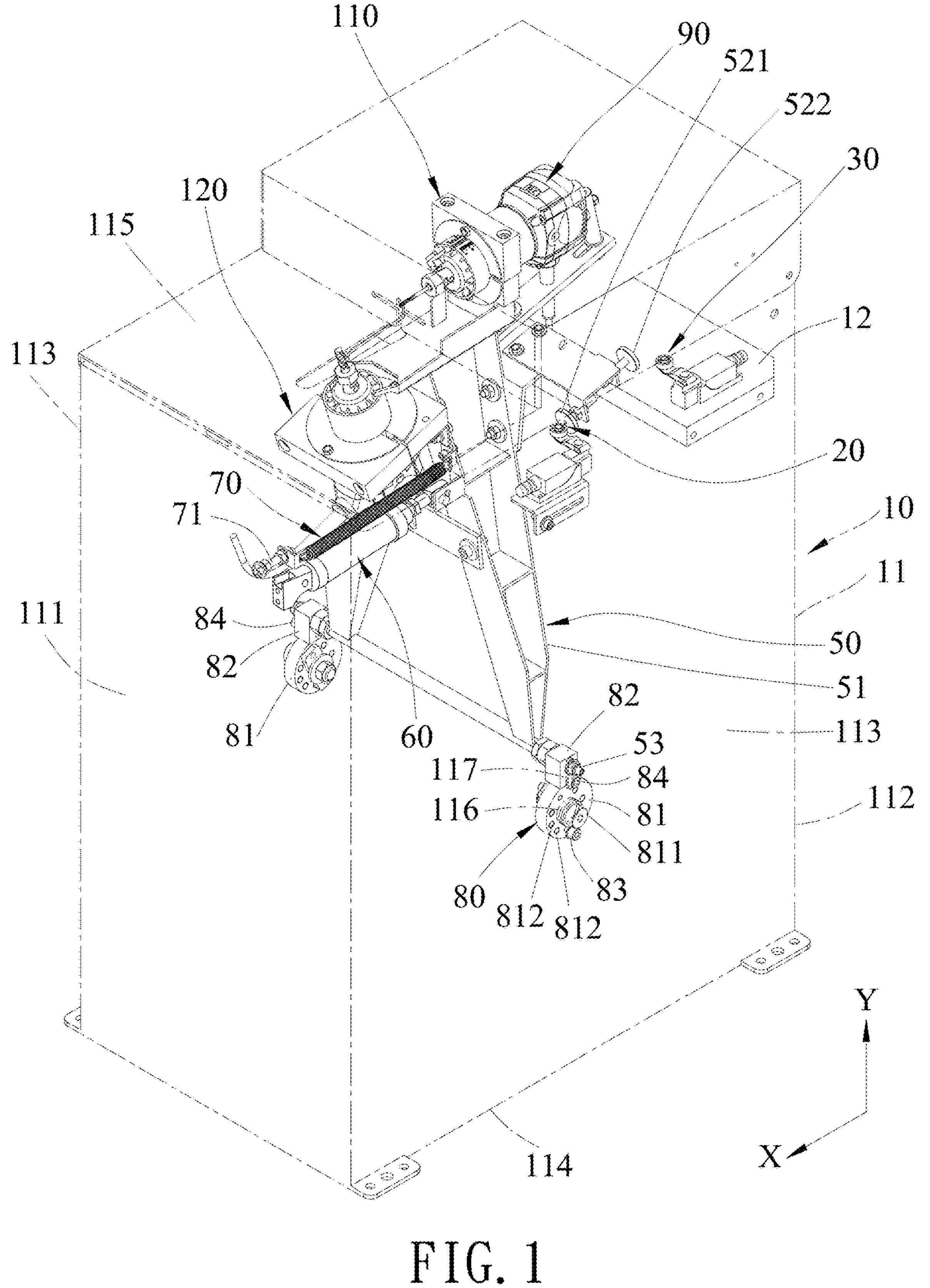
FIG. 1 is a perspective view of an embodiment of a pocket hole drilling device according to the present disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
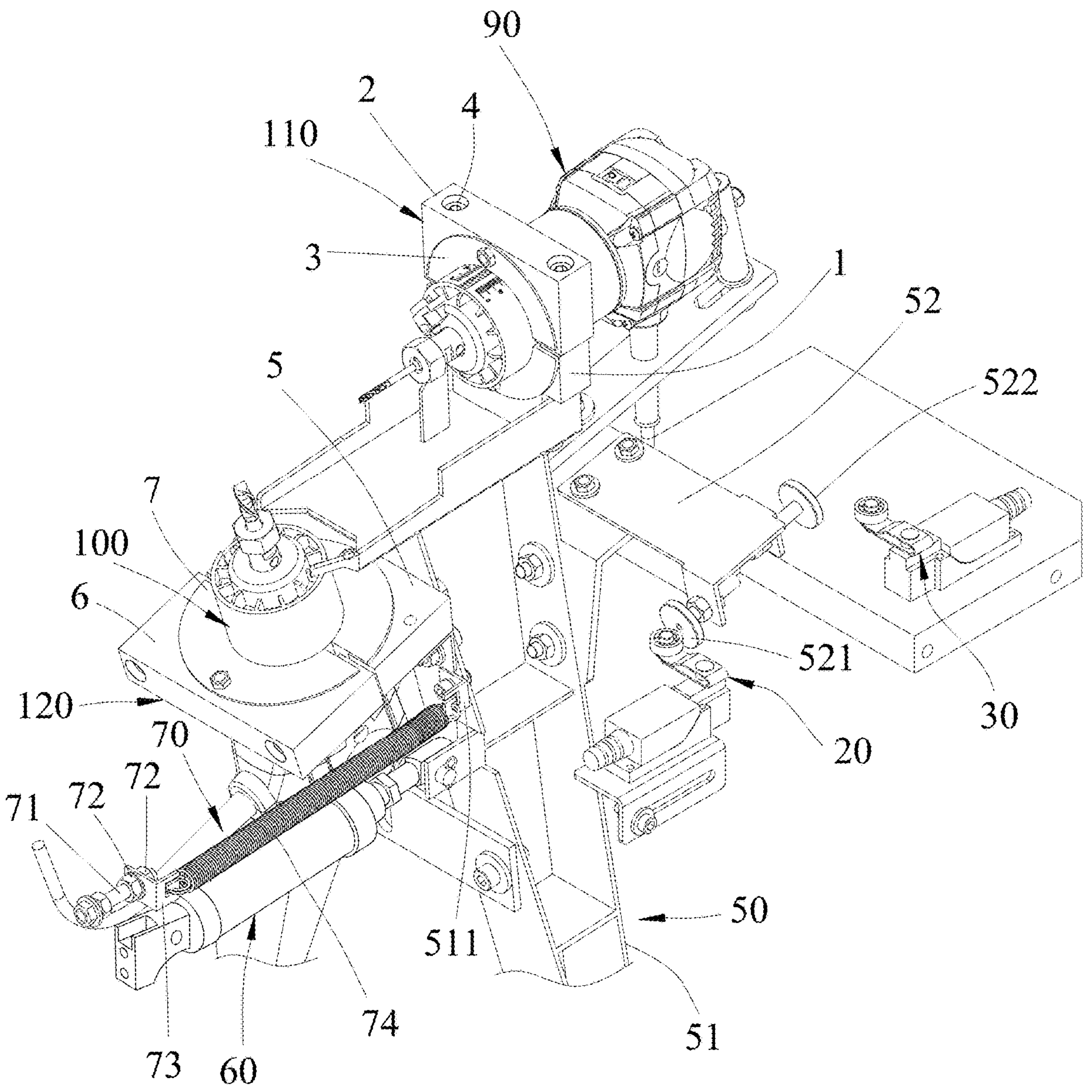
FIG. 2 is a fragmentary enlarged view of a portion of FIG. 1.
Figure 4:
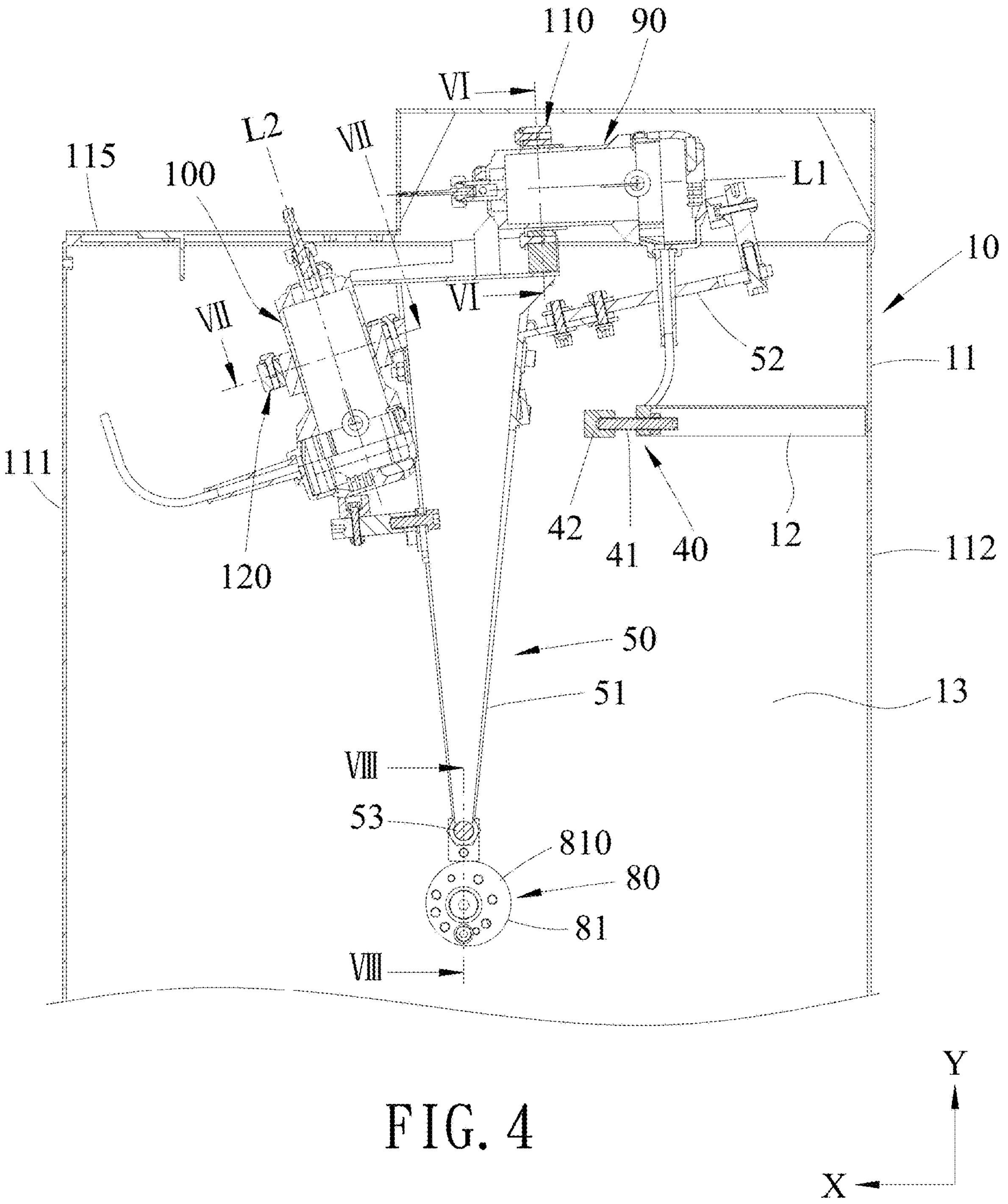
FIG. 4 is a fragmentary, schematic sectional view of the embodiment.

Referring to FIGS. 1, 2, and 4, an embodiment of a pocket hole drilling device according to the present disclosure includes a rack 10, a front sensing switch 20, a rear sensing switch 30, a buffer unit 40, a rotary frame 50, a driving unit 60, a resilient unit 70, an adjusting unit 80, a drilling unit 90, a routing unit 100, a first sleeve unit 110, and a second sleeve unit 120.

The rack 10 includes a case wall 11 that defines an accommodating space 13, and a positioning seat 12 that is fixedly connected to the case wall 11 and that is disposed in the accommodating space 13. The case wall 11 includes a front wall plate 111, a rear wall plate 112 that is spaced apart from the front wall 111 along a front-rear direction (X), two side wall plates 113 each of which is connected to the front wall plate 111 and the rear wall plate 112, a bottom wall plate 114 that is connected to the front wall plate 111, the rear wall plate 112, and the side wall plates 113, and a top wall plate 115 that is spaced apart from the bottom wall plate 114 in an up-down direction (Y) perpendicular to the front-rear direction (X). Each of the side wall plates 113 is formed with a rotation hole 116, and an elongated hole 117 that is disposed above the rotation hole 116. Only the rotation hole 116 and the elongated hole 117 of one of the side wall plates 113 are visible in FIG. 1 due to a viewing angle.

The front sensing switch 20 is mounted to one of the side wall plates 113 of the rack 10. The front sensing switch 20 is a micro switch The rear sensing switch 30 is mounted to the positioning seat 12 of the rack 10, and is located at one side of the front sensing switch 20 along the front-rear direction (X).

Referring to FIG. 4, the buffer unit 40 is mounted to the positioning seat 12 of the rack 10. The buffer unit 40 includes an adjusting rod 41 that threadedly engages the positioning seat 12, and a buffer member 42 that is made of a non-rigid material and that is connected to the adjusting rod 41.

The rotary frame 50 is rotatably connected to the rack 10, and is operable to rotate among an initial position, a first position, and a second position. The rotary frame 50 includes a main frame body 51, a cantilever 52 that is connected to the main frame body 51, and a rotation shaft 53 that is connected to the main frame body 51 and that is rotatably connected to the rack 10. The main frame body 51 includes a rear hook 511. The cantilever 52 includes a front touch member 521 and a rear touch member 522. The rotation shaft 53 extends through the elongated holes 117 of the side wall plates 113, and is movable relative to the rack 10 along the up-down direction (Y). The front touch member 521 corresponds in position to the front sensing switch 20, and is closer to the front sensing switch 20 than the rear touch member 522. The rear touch member 522 corresponds in position to the rear sensing switch 30, and is closer to the rear sensing switch 30 than the front touch member 521.

The driving unit 60 is connected to the rack 10 and the rotary frame 50. The driving unit 60 urges the rotary frame 50 to rotate among the initial position, the first position, and the second position. The driving unit 60 is a pressure cylinder (e.g., a pneumatic cylinder or a hydraulic cylinder).

The resilient unit 70 is connected to the rack 10 and the rotary frame 50. The resilient unit 70 resiliently biases the rotary frame 50 from the second position toward the first position. The resilient unit 70 includes a bolt 71 that is fixedly connected to the rack 10, two clamping nuts 72 that adjustably and threadedly engage the bolt 71, a front hook 73 that is clamped between the clamping nuts 72, and a tension spring 74 that is hooked to the front hook 73 and the rear hook 511 of the rotary frame 50.

Figure 8:
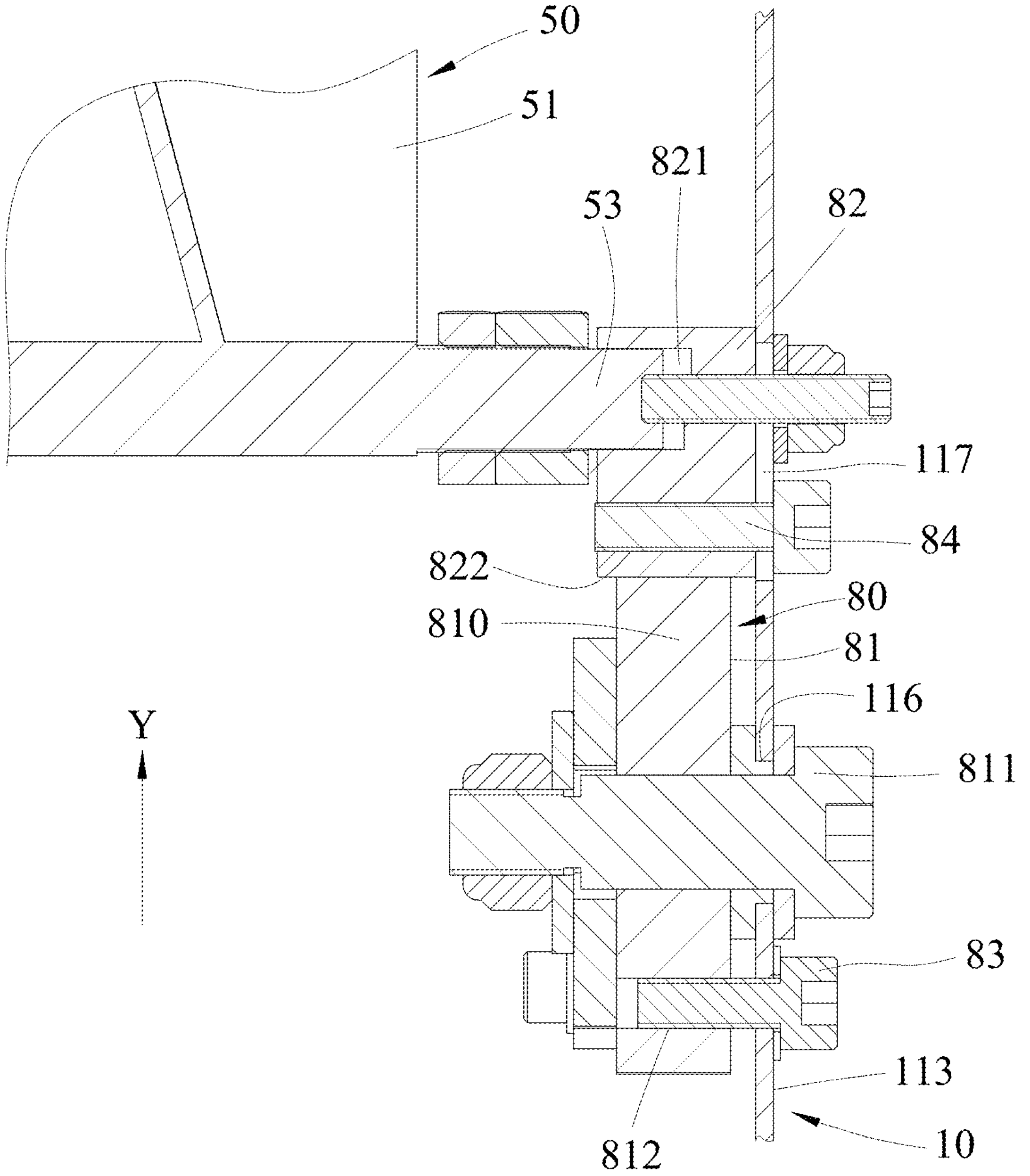
FIG. 8 is a fragmentary sectional view taken along line VIII-VIII in FIG. 4.

In cooperation with FIGS. 1, 4, and 8, the adjusting unit 80 is operable to adjust a position of the rotary frame 50 relative to the rack 10 and to position the rotary frame 50. The adjusting unit 80 includes two rotary plates 81 that are axially and rotatably disposed on the rack 10 (i.e., the rotary plates 81 are arranged along an axis and rotatable about the axis), two adjusting blocks 82 that respectively abut against top ends of the rotary plates 81, two locking screws 83 (only one of the locking screws 83 is visible in FIG. 1 due to the viewing angle) that extend through the rack 10 and that respectively and threadedly engage the rotary plates 81, and two fastening screws 84 that extend through the rack 10 and that respectively and threadedly engage the adjusting blocks 82. Each of the rotary plates 81 includes a main plate body 810, a pin shaft 811 that extends through the main plate body 810 and that is axially disposed on the rotation hole 116 of a respective one of the side wall plates 113, and a plurality of adjusting holes 812 that are formed in the main plate body 810 and that surround an outer periphery of the pin shaft 811. In this embodiment, the main plate body 810 of each of the rotary plates 81 is configured to be a circular plate. For each of the rotary plates 81, the pin shaft 811 is deviated from a center of the main plate body 810. Each of the adjusting blocks 82 has a shaft hole 821, and a locking hole 822 that is located at one side of the shaft hole 821. The rotation shaft 53 extends through the shaft holes 821 of the adjusting blocks 82. Each of the locking screws 83 threadedly engages one of the adjusting holes 812 of the respective one of the rotary plates 81. Each of the fastening screws 84 threadedly engages the locking hole 822 of the respective one of the adjusting blocks 82.

The drilling unit 90 is mounted to a top portion of the rotary frame 50. The drilling unit 90 extends along a first axis (L1).

The routing unit 100 is mounted to a front side of the rotary frame 50. The routing unit 100 extends along a second axis (L2).

Figure 3:
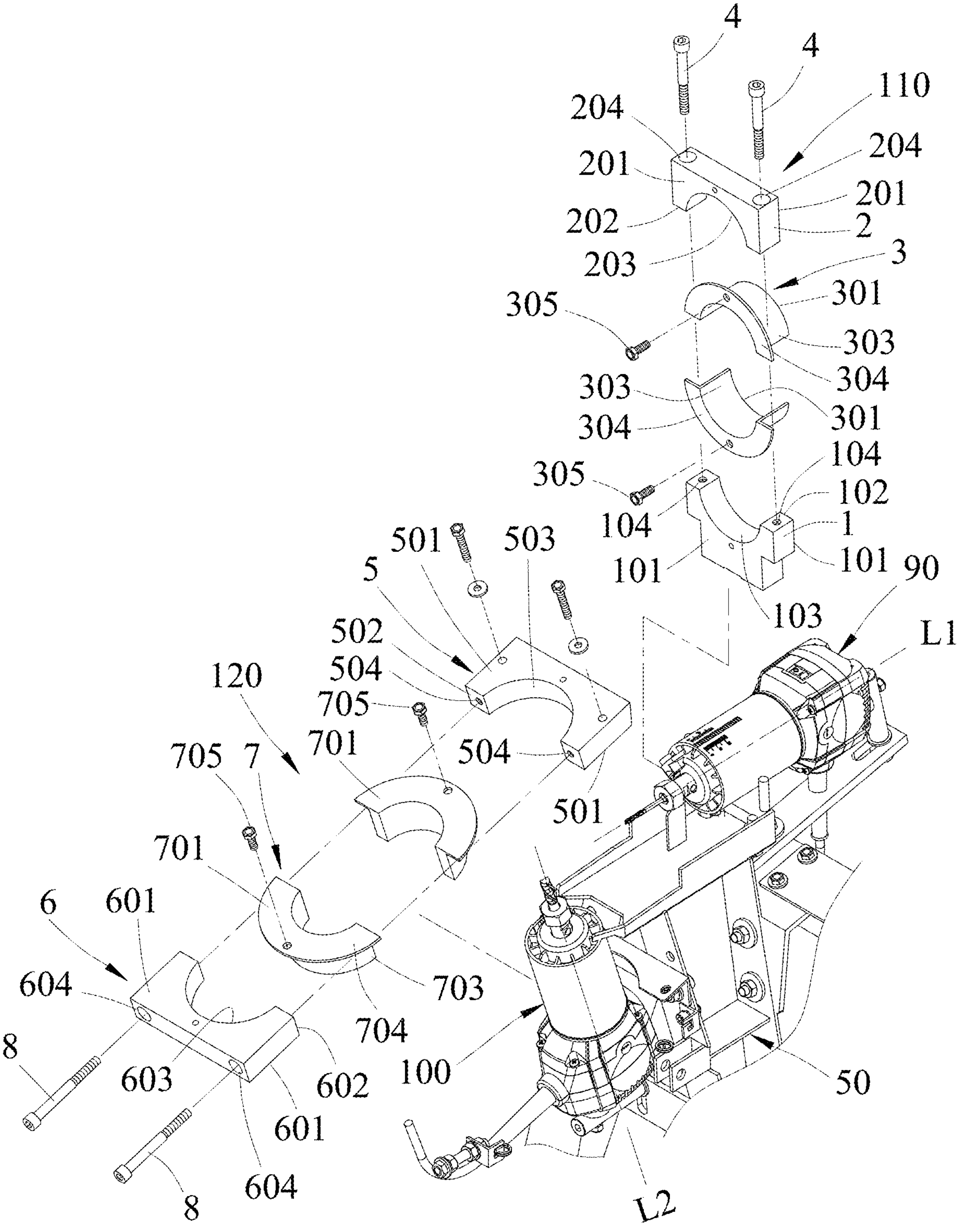
FIG. 3 is a fragmentary, partly exploded perspective view of the embodiment.
Figure 5:
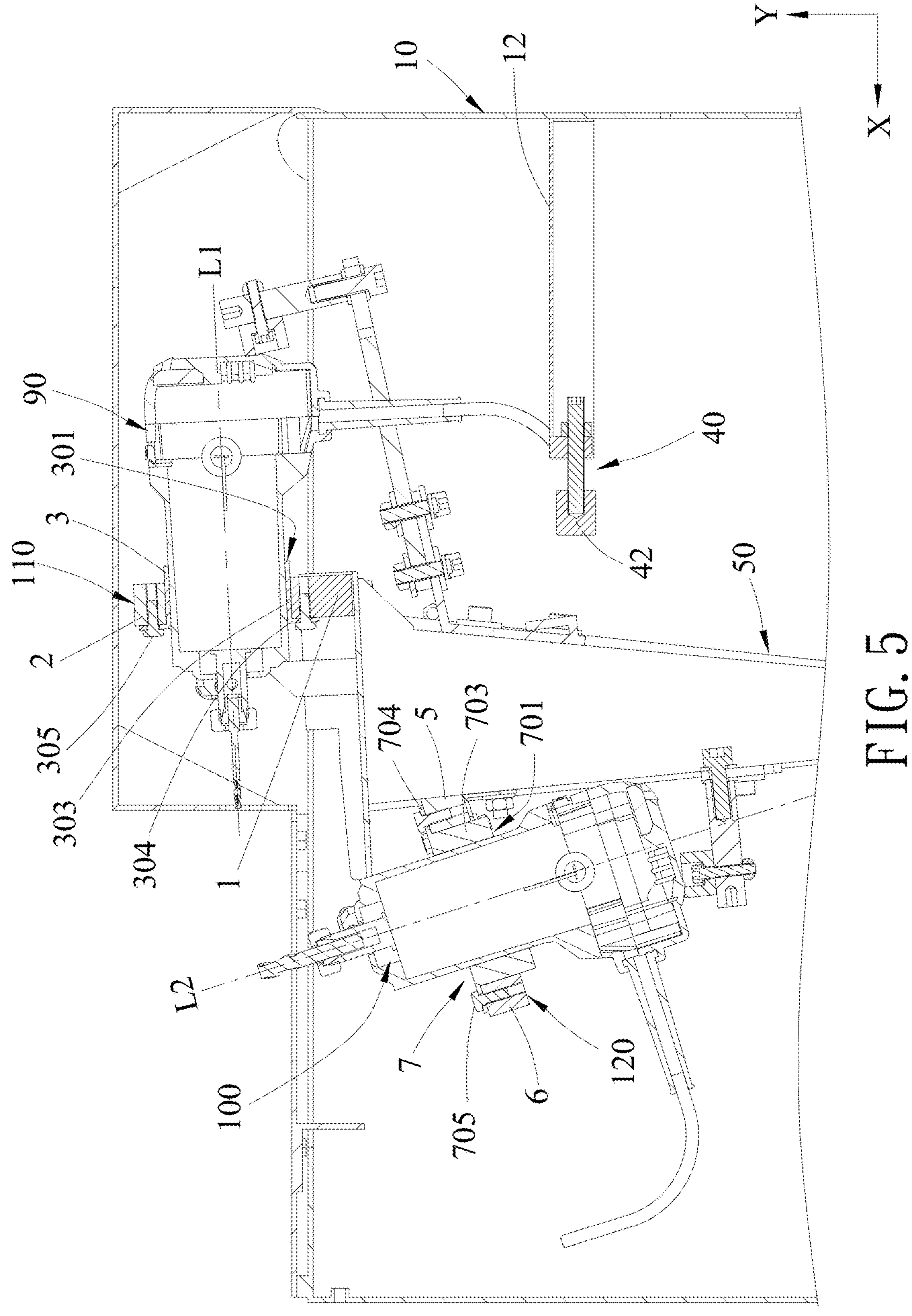
FIG. 5 is a fragmentary enlarged view of a portion of FIG. 4.

Referring to FIGS. 3 and 5, the first sleeve unit 110 surrounds and holds the drilling unit 90, and is connected to the rotary frame 50. The first sleeve unit 110 includes a first fixing seat 1 that is connected to the rotary frame 50, a first mounting seat 2 that is removably connected to the first fixing seat 1, a first bushing member 3 that is clamped between the first fixing seat 1 and the first mounting seat 2 and that is fixedly fastened to the first fixing seat 1 and the first mounting seat 2, and two first bolts 4 that fasten the first mounting seat 2 to the first fixing seat 1. The first fixing seat 1 has two first fixing side surfaces 101, a first fixing end surface 102 that is connected to the first fixing side surfaces 101, a first fixing groove 103 that is recessed from the first fixing end surface 102 and that is arc-shaped, and two first fastening holes 104 that are respectively disposed on two opposite sides of the first fixing groove 103 and that are formed in the first fixing end surface 102. The first mounting seat 2 has two first mounting side surfaces 201, a first mounting end surface 202 that is connected to the first mounting side surfaces 201, a first mounting groove 203 that is recessed from the first mounting end surface 202 and that is arc-shaped, and two first through holes 204 that are respectively disposed on two opposite sides of the first mounting groove 203.

Figure 6:
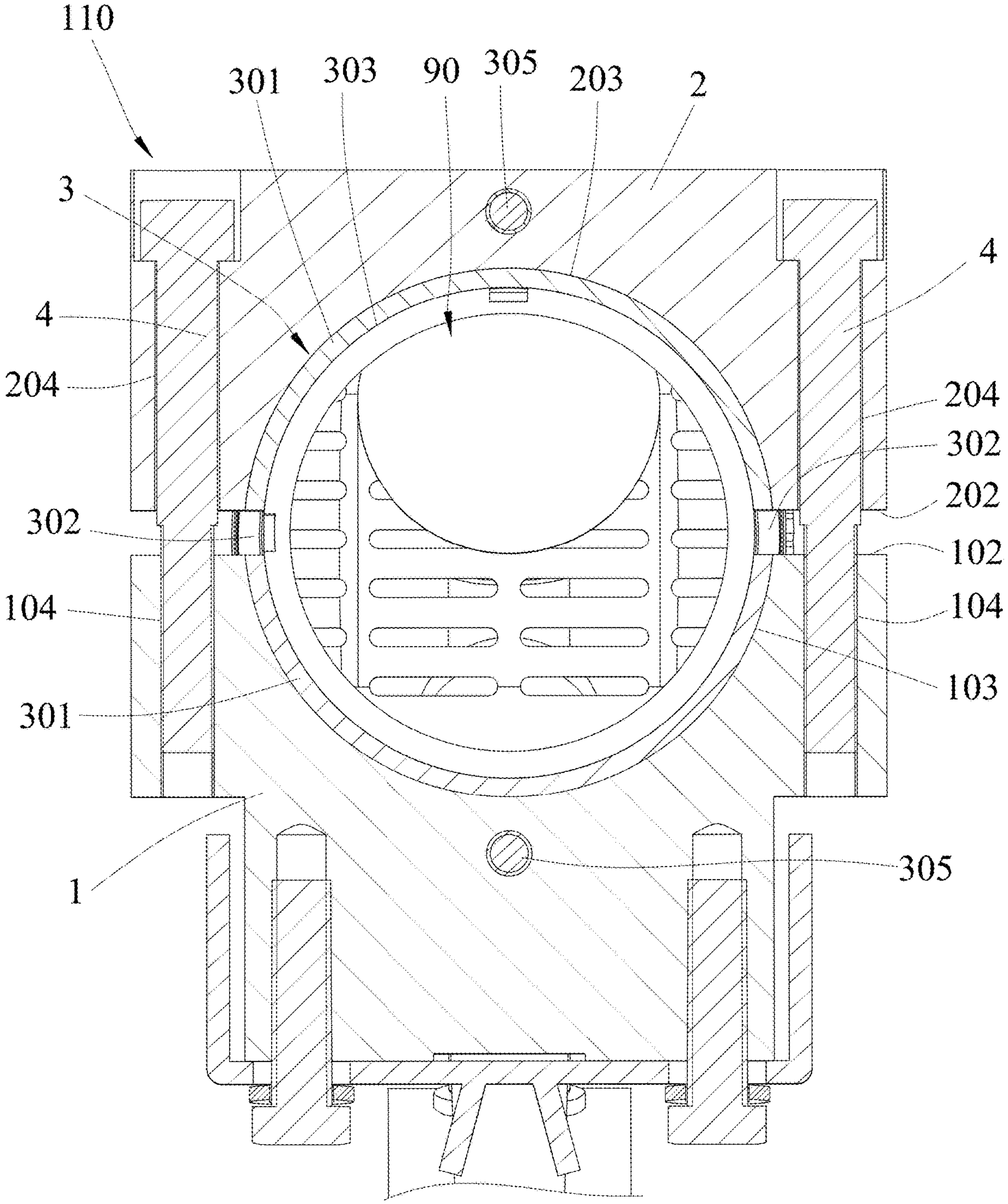

The first bushing member 3 is constrained by the drilling unit 90, the first fixing seat 1, and the first mounting seat 2, and a diameter thereof is adjustable. The first bushing member 3 has two first lining plates 301 each of which is arc-shaped, two first gaps 302 (see FIG. 6) that are located between the first lining plates 301, and two positioning screws 305. By virtue of the first gaps 302, when the first fixing seat 1 and the first mounting seat 2 respectively push the first lining plates 301 toward the drilling unit 90, the first bushing member 3 is clamped between the first fixing seat 1 and the first mounting seat 2, and the diameter of the first busing member 3 is adjustable. In one embodiment, the first busing member 3 is resiliently deformable. A cross section of each of the first lining plates 301 parallel to the first axis (L1) is L-shaped (see FIG. 5). Each of the first lining plates 301 has a first axial section 303, and a first radial section 304 that is connected to the first axial section 303 such that the cross section of each of the first lining plates 301 parallel to the first axis (L1) is L-shaped. The first axial sections 303 of the first lining plates 301 respectively correspond in position to the first fixing groove 103 and the first mounting groove 203. The first radial sections 304 of the first lining plates 301 respectively correspond in position to one of the first fixing side surfaces 101 and one of the first mounting side surfaces 201. Each of the first radial sections 304 is fastened to a respective one of the first fixing seat 1 and the first mounting seat 2 by a respective one of the positioning screws 305.

The first bolts 4 respectively extend through the first through holes 204 of the first mounting seat 2, and respectively and threadedly engage the first fastening holes 104 of the first fixing seat 1.

Referring to FIGS. 3 and 5, the second sleeve unit 120 surrounds and holds the routing unit 100, and is connected to the rotary frame 50. The second sleeve unit 120 includes a second fixing seat 5 that is connected to the rotary frame 50, a second mounting seat 6 that is removably connected to the second fixing seat 5, a second bushing member 7 that is clamped between the second fixing seat 5 and the second mounting seat 6 and that is fixedly fastened to the second fixing seat 5 and the second mounting seat 6, and two second bolts 8 that fasten the second mounting seat 6 to the second fixing seat 5. The second fixing seat 5 has two second fixing side surfaces 501, a second fixing end surface 502 that is connected to the second fixing side surfaces 501, a second fixing groove 503 that is recessed from the second fixing end surface 502 and that is arc-shaped, and two second fastening holes 504 that are respectively disposed on two opposite sides of the second fixing groove 503 and that are formed in the second fixing end surface 502. The second mounting seat 6 has two second mounting side surfaces 601, a second mounting end surface 602 that is connected to the second mounting side surfaces 601, a second mounting groove 603 that is recessed from the second mounting end surface 602 and that is arc-shaped, and two second through holes 604 that are respectively disposed on two opposite sides of the second mounting groove 603.

Figure 7:
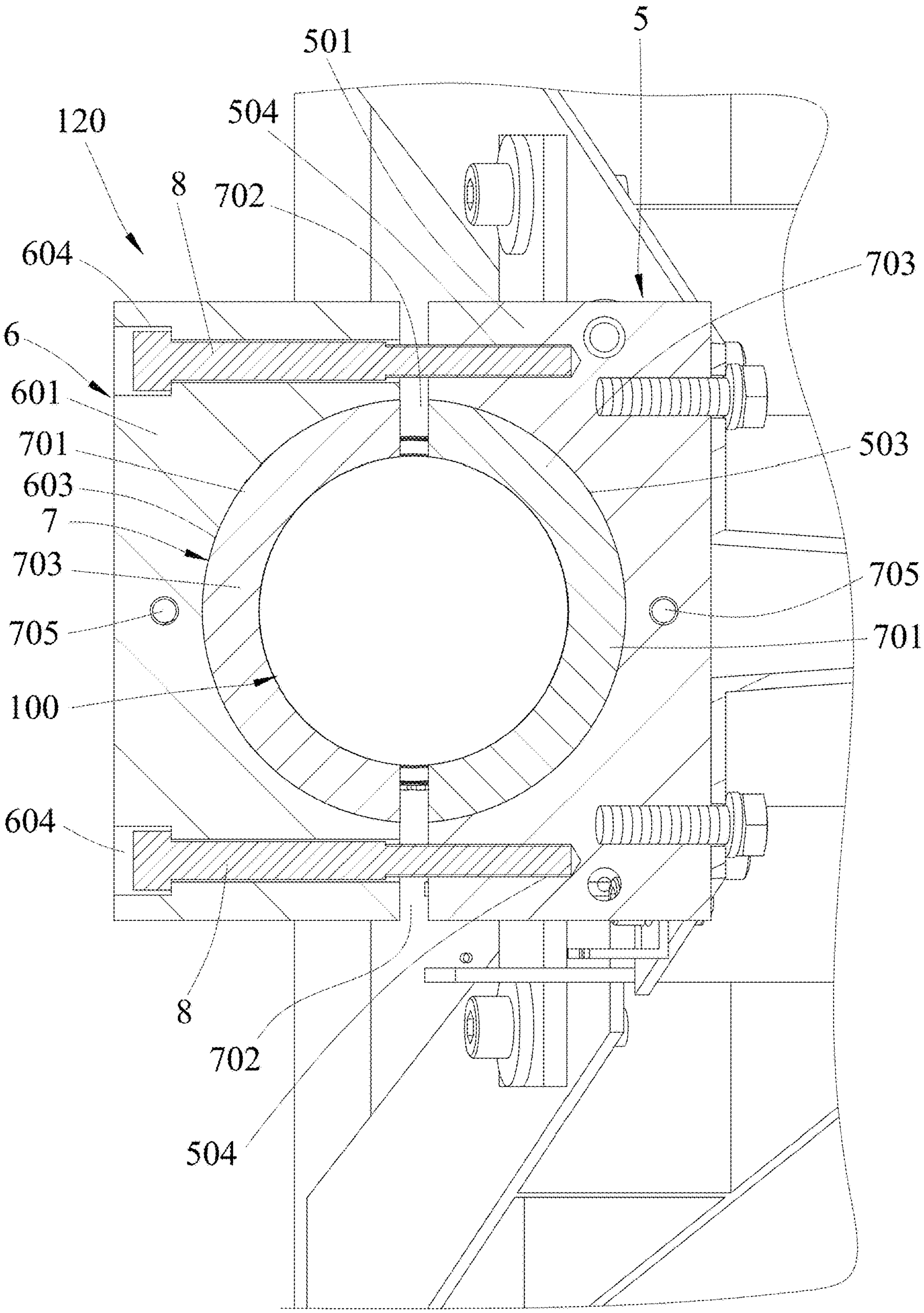
FIG. 7 is a fragmentary sectional view taken along line VII-VII in FIG. 4.

The second bushing member 7 is constrained by the routing unit 100, the second fixing seat 5, and the second mounting seat 6, and a diameter thereof is adjustable. The second bushing member 7 has two second lining plates 701 each of which is arc-shaped, two second gaps 702 (see FIG. 7) that are located between the second lining plates 701, and two positioning screws 705. By virtue of the second gaps 702, when the second fixing seat 5 and the second mounting seat 6 respectively push the second lining plates 701 toward the routing unit 100, the second bushing member 7 is clamped between the second fixing seat 5 and the second mounting seat 6, and the diameter of the second busing member 7 is adjustable. In one embodiment, the second busing member 7 is resiliently deformable. A cross section of each of the second lining plates 701 parallel to the second axis (L2) is L-shaped (see FIG. 5). Each of the second lining plates 701 has a second axial section 703, and a second radial section 704 that is connected to the second axial section 703 such that the cross section of each of the second lining plates 701 parallel to the second axis (L2) is L-shaped. The second axial sections 703 of the second lining plates 701 respectively correspond in position to the second fixing groove 503 and the second mounting groove 603. The second radial sections 704 of the second lining plates 701 respectively correspond in position to one of the second fixing side surfaces 501 and one of the second mounting side surfaces 601. Each of the second radial sections 704 is fastened to a respective one of the second fixing seat 5 and the second mounting seat 6 by a respective one of the positioning screws 705.

The second bolts 8 respectively extend through the second through holes 604 of the second mounting seat 6, and respectively and threadedly engage the second fastening holes 504 of the second fixing seat 5.

As shown in FIGS. 1 and 4, when the pocket hole drilling device has been assembled and when the rotary frame 50 is in the initial position, the front touch member 521 does not touch the front sensing switch 20, and the rear touch member 522 does not touch the rear sensing switch 30.

When the driving unit 60 is activated, and when the driving unit 60 drives the rotary frame 50 to rotate in a counterclockwise direction (viewing from FIG. 4) to the first position (not shown), the front touch member 521 touches and actuates the front sensing switch 20 so that the front sensing switch 20 outputs a front limit stop signal and that the driving unit 60 is immediately stopped. The front limit stop signal is connected to the drilling unit 90, and controls the drilling unit 90 to perform a drilling operation.

When the driving unit 60 is activated, and when the driving unit 60 drives the rotary frame 50 to rotate in a clockwise direction (viewing from FIG. 4) to the second position (not shown), the rear touch member 522 touches and actuates the rear sensing switch 30 so that the rear sensing switch 30 outputs a rear limit stop signal and that the driving unit 60 is immediately stopped. The rear limit stop signal is connected to the routing unit 100, and controls the routing unit 100 to perform a routing operation.

In the abovementioned operation, by virtue of the resilient unit 70 being connected to the rack 10 and the rotary frame 50, and by virtue of the resilient unit 70 resiliently biasing the rotary frame 50 from the second position toward the first position, the rotary frame 50 may return to the initial position after the routing operation is completed (i.e., the resilient unit 70 may not resiliently bias the rotary frame 50 toward the first position when the rotary frame 50 is in the initial position).

Therefore, by virtue of the first sleeve unit 110 surrounding and holding the drilling unit 90 and being connected to the rotary frame 50, and by virtue of the second sleeve unit 120 surrounding and holding the routing unit 100 and being connected to the rotary frame 50, the drilling unit 90 and the routing unit 100 may be securely mounted to the rotary frame 50. In addition, each of the first axial sections 303 of the first lining plats 301 and the second axial sections 703 of the second lining plates 701 can be made in different thicknesses so that the first sleeve unit 110 and the second sleeve unit 120 may be suitable for different brands or different types of the drilling unit 90 and the routing unit 100 even if a size of an outer diameter of a motor that is used in each of the drilling unit 90 and the routing unit 100 differs between brands or types, and that a central point of each of the drilling unit 90 and the routing unit 100 relative to a respective one of the first sleeve unit 110 and the second sleeve unit 120 may be adjustable, thereby achieving a purpose of adjusting a processing position of each of the drilling unit 90 and the routing unit 100.

By virtue of the bolt 71 being fixedly connected to the rack 10, by virtue of the clamping nuts 72 adjustably and threadedly engaging the bolt 71, by virtue of the front hook 73 being clamped between the clamping nuts 72, and by virtue of the tension spring 74 being hooked to the front hook 73 and the rear hook 511, a resilient force provided by the tension spring 74 is adjustable. It is noted that, the rack 10 may further include a main resilient member (not shown) that resiliently biases the rotary frame 50 from the first position to the initial position.

Furthermore, by virtue of the rotary plates 81 being axially disposed on the rack 10, by virtue of the adjusting blocks 82 abutting against the top ends of the rotary plates 81, by virtue of the locking screws 83 extending through the rack 10 and respectively and threadedly engaging the rotary plates 81, by virtue of the fastening screws 84 extending through the rack 10 and respectively and threadedly engaging the adjusting blocks 82, and by virtue of the pin shaft 811 of each of the rotary plates 81 being deviated from the center of the main plate body 810 of the rotary plate 81, each of the rotary plates 81 may serve as a disc cam. Thus, when the locking screws 83 and the fastening screws 84 are loosened and when the main plate body 810 of each of the rotary plates 81 is rotated about the pin shaft 811 of the rotary plate 81, the adjusting blocks 82 may urge the rotation shaft 53 of the rotary frame 50 to move relative to the rack 10 along the elongated holes 117 along the up-down direction (Y) such that a height of the rotary frame 50 relative to the rack 10 is adjusted, thereby adjusting a routing depth of the routing operation and a drilling position of the drilling operation. After the adjustment, the locking screws 83 fasten the rotary plates 81 to the rack 10 again and the fastening screws 84 fasten the adjusting blocks 82 to the rack 10 again to ensure that the rotary frame 50 is positioned on the rack 10.

The buffer unit 40 buffers rotation of the rotary frame 50 when the rotary frame 50 rotates in the clockwise direction (viewing from FIG. 4). That is, when the rotary frame 50 rotates to the second position, the buffer unit 40 buffers an impact generated by the rotation of the rotary frame 50 so that noise may be reduced and that component damage in the pocket hole drilling device may be prevented.

Figure 9:
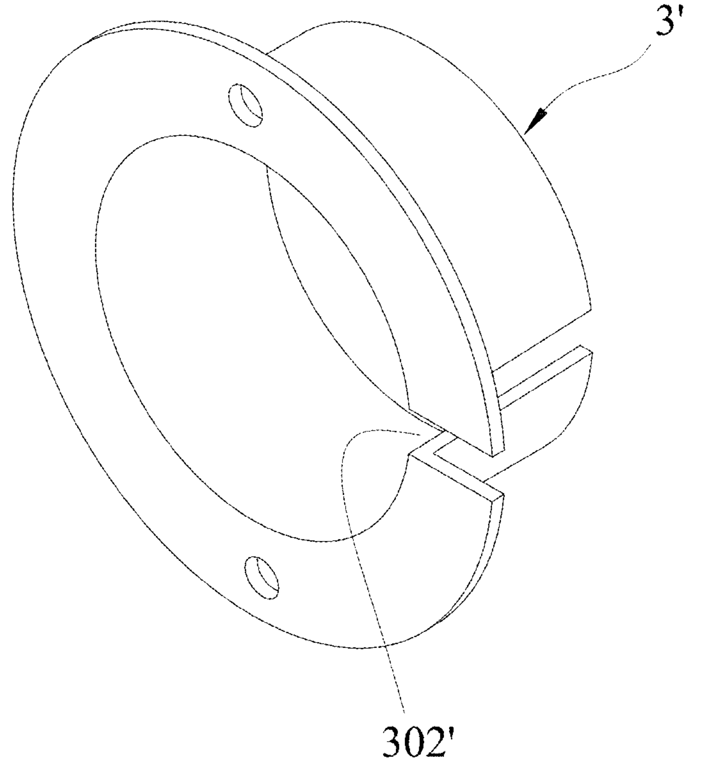
FIG. 9 is a perspective view of a modification of a first bushing member (or a second bushing member) of the embodiment.

As shown FIG. 9, a modification of the first bushing member 3 (or the second bushing member 7) is referred to as the first bushing member 3' (or the second bushing member 7'). The first bushing member 3' (or the second bushing member 7') has only one first gap 302' (or only one second gap 702'). The first bushing member 3' (or the second bushing member 7') may also achieve the aforesaid function and effect of the first bushing member 3 (or the second bushing member 7) of the embodiment.

In summary, the pocket hole drilling device according to the present disclosure has a relatively simple structure, is relatively easy to manufacture and to assemble, and is suitable for different types or different sizes of the motors used in the drilling unit 90 and the routing unit 100. Therefore, the purpose of the present disclosure is certainly achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A pocket hole drilling device comprising:

a rack;

a rotary frame rotatably connected to the rack and rotatable between a first position and a second position;

a drilling unit mounted to the rotary frame;

a routing unit mounted to the rotary frame;

a first sleeve unit surrounding and holding the drilling unit and connected to the rotary frame, the first sleeve unit including a first fixing seat that is connected to the rotary frame, a first mounting seat that is removably connected to the first fixing seat, a first bushing member that is clamped between the first fixing seat and the first mounting seat, and two first bolts that fasten the first mounting seat to the first fixing seat, the first bushing member having at least one first gap, the first bushing member being constrained by the drilling unit, the first fixing seat, and the first mounting seat, and a diameter thereof being adjustable; and a second sleeve unit surrounding and holding the routing unit and connected to the rotary frame, the second sleeve unit including a second fixing seat that is connected to the rotary frame, a second mounting seat that is removably connected to the second fixing seat, a second bushing member that is clamped between the second fixing seat and the second mounting seat, and two second bolts that fasten the second mounting seat to the second fixing seat, the second bushing member having at least one second gap, the second bushing member being constrained by the routing unit, the second fixing seat, and the second mounting seat, and a diameter thereof being adjustable.

2. The pocket hole drilling device as claimed in claim 1, wherein the at least one first gap of the first bushing member of the first sleeve unit includes two first gaps, the first bushing member including two first lining plates each of which is arc-shaped, the first gaps being located between the first lining plates, the at least one second gap of the second bushing member of the second sleeve unit including two second gaps, the second bushing member including two second lining plates each of which is arc-shape, the second gaps being located between the second lining plates.

3. The pocket hole drilling device as claimed in claim 2, wherein the first fixing seat of the first sleeve unit has two first fixing side surfaces, a first fixing end surface that is connected to the first fixing side surfaces, a first fixing groove that is recessed from the first fixing end surface and that is arc-shaped, and two first fastening holes that are respectively disposed on two opposite sides of the first fixing groove and that are formed in the first fixing end surface, the first mounting seat having two first mounting side surfaces, a first mounting end surface that is connected to the first mounting side surfaces, a first mounting groove that is recessed from the first mounting end surface and that is arc-shaped, and two first through holes that are respectively disposed on two opposite sides of the first mounting groove, the first bolts respectively extending through the first through holes of the first mounting seat and respectively and threadedly engaging the first fastening holes of the first fixing seat, the second fixing seat of the second sleeve unit having two second fixing side surfaces, a second fixing end surface that is connected to the second fixing side surfaces, a second fixing groove that is recessed from the second fixing end surface and that is arc-shaped, and two second fastening holes that are respectively disposed on two opposite sides of the second fixing groove and that are formed in the second fixing end surface, the second mounting seat having two second mounting side surfaces, a second mounting end surface that is connected to the second mounting side surfaces, a second mounting groove that is recessed from the second mounting end surface and that is arc-shaped, and two second through holes that are respectively disposed on two opposite sides of the second mounting groove, the second bolts respectively extending through the second through holes of the second mounting seat and respectively and threadedly engaging the second fastening holes of the second fixing seat.

4. The pocket hole drilling device as claimed in claim 3, wherein the drilling unit extends along a first axis, a cross section of each of the first lining plates parallel to the first axis being L-shaped, each of the first lining plates having a first axial section, and a first radial section that is connected to the first axial section, the first axial sections of the first lining plates respectively corresponding in position to the first fixing groove and the first mounting groove, the first radial sections of the first lining plates respectively corresponding in position to one of the first fixing side surfaces and one of the first mounting side surfaces, the routing unit extending along a second axis, a cross section of each of the second lining plates parallel to the second axis being L-shaped, each of the second lining plates having a second axial section, and a second radial section that is connected to the second axial section, the second axial sections of the second lining plates respectively corresponding in position to the second fixing groove and the second mounting groove, the second radial sections of the second lining plates respectively corresponding in position to one of the second fixing side surfaces and one of the second mounting side surfaces.

5. The pocket hole drilling device as claimed in claim 1, wherein the rotary frame includes a rotation shaft that is rotatably connected to the rack, the rotation shaft being movable relative to the rack along an up-down direction, the pocket hole drilling device further comprising an adjusting unit that is operable to adjust a position of the rotary frame relative to the rack and to position the rotary frame.

6. The pocket hole drilling device as claimed in claim 5, wherein the adjusting unit includes two rotary plates that are axially disposed on the rack, two adjusting blocks that respectively abut against top ends of the rotary plates, two locking screws that extend through the rack and that respectively and threadedly engage the rotary plates, and two fastening screws that extend through the rack and that respectively and threadedly engage the adjusting blocks, each of the rotary plates including a main plate body, a pin shaft that extends through the main plate body and that is axially disposed on the rack, and a plurality of adjusting holes that are formed in the plate body and that surround an outer periphery of the pin shaft, for each of the rotary plates, the pin shaft being deviated from a center of the main plate body, each of the locking screws threadedly engaging one of the adjusting holes of the respective one of the rotary plates.

7. The pocket hole drilling device as claimed in claim 1, wherein the at least one first gap of the first bushing member of the first sleeve unit includes one first gap, and the at least one second gap of the second bushing member of the second sleeve unit includes one second gap.

* * * * *